United States Patent [19]
Luthier et al.

[11] Patent Number: 5,418,417
[45] Date of Patent: May 23, 1995

[54] PIEZOELECTRIC MOTOR

[75] Inventors: Roland Luthier, St-Sulpice; Raymond Froidevaux, Boudry, both of Switzerland

[73] Assignee: Asulab S.A., Biel, Switzerland

[21] Appl. No.: 90,253

[22] Filed: Jul. 13, 1993

[30] Foreign Application Priority Data

Jul. 20, 1992 [CH] Switzerland ............... 02282/92

[51] Int. Cl.$^6$ .................. H01L 41/09; H02N 2/00
[52] U.S. Cl. ............................................. 310/323
[58] Field of Search .................................... 310/323

[56] References Cited

U.S. PATENT DOCUMENTS

| | | | |
|---|---|---|---|
| 4,548,090 | 10/1985 | Sashida | 74/88 |
| 4,655,096 | 4/1987 | Westhaver et al. | 74/5 F |
| 4,871,937 | 10/1989 | Kawai | 310/323 |
| 5,233,257 | 8/1993 | Luthier et al. | 310/323 |
| 5,247,220 | 9/1993 | Miyazawa et al. | 310/323 |

FOREIGN PATENT DOCUMENTS

| | | | |
|---|---|---|---|
| 0294102 | 12/1988 | European Pat. Off. | H01L 41/08 |
| 0065071 | 3/1991 | Japan | 310/323 |

OTHER PUBLICATIONS

Patent Abstract of Japan Improvement on Rotor Support of Ultrasonic Motor; Shinsei Kogyo K.K; vol. 12, No. 118 (E-600) (2965) Apr. 13, 1988 JP-A-62 247 775.
Patent Abstracts of Japan Ultrasonic Motor; Nikon Corp.; vol. 12 No. 369 (E-665) (3216); Oct. 4, 1988 JP-A-63 121 478.

*Primary Examiner*—Thomas M. Dougherty
*Attorney, Agent, or Firm*—Griffin Butler Whisenhunt & Kurtossy

[57] ABSTRACT

A piezoelectric motor. Such motor includes a support (2), a stator (S2, S3) fixed to the support (2), piezoelectric means (10) adapted to be electrically excited so as to induce a vibratory motion in the stator (S2, S3), a rotor (R2, R3) mounted for rotation relative to the support (2), such rotor including a body on which transmission means (36) are arranged and adapted to transmit the vibratory motion of the stator (S2, S3) to the rotor (R2, R3) and in order to drive such rotor in rotation, and elastic support means (79) for the rotor on the stator, characterized in that the body of the rotor is formed by a structure (D2, D3) which is elastically deformable, at least in the direction of the stator, and which at least in part forms the support means (79). The invention is applied, for example, to a timepiece.

9 Claims, 10 Drawing Sheets

PIEZOELECTRIC MOTOR

The present invention concerns a piezoelectric motor. More specifically, the invention concerns a piezoelectric motor of small thickness, capable of equipping a timepiece.

BACKGROUND OF THE INVENTION

A piezoelectric motor of small dimensions capable of satisfying such an application is described in the patent application Ser. No. 07/759,561, filed Sep. 13, 1991, now U.S. Pat. No. 5,233,257. Such piezoelectric motor which is shown on the attached FIGS. 1, 2 and 3 and which will be described hereinafter in a detailed fashion, comprises in a standard manner, on the one hand, a stator associated with piezoelectric means and, on the other hand, a rotor which is assembled for rotation on such stator. The piezoelectric means are constituted by a polarized ceramic which can be electrically excited in order to induce a vibratory motion in the stator while the rotor is provided with flexion blades arranged to bear elastically on the stator. Such blades are adapted to assure transmission of such vibratory motion to the rotor.

The elastic bearing of the rotor on the stator via such transmission blades is assured by sustaining means including a spring in the form of a dome. Such spring is axially maintained by a headed screw engaged in a fixed stepped spindle which forms a support and which urges the rotor along such spindle. A roller bearing is arranged between the head of the screw and the spring enabling concomitant rotation of the assembly rotor-spring.

Such motor exhibits a space requirement in height such that it cannot equip timepieces exhibiting a naturally small thickness.

Thus, the present invention has as purpose to overcome this drawback in providing a piezoelectric motor of small thickness capable of equipping a timepiece without spoiling its dimensional characteristics.

SUMMARY OF THE INVENTION

To this effect, the present invention has as object a piezoelectric motor of the type comprising
  a support,
  a stator fixed to the support,
  piezoelectric means adapted to be electrically excited so as to induce a vibratory motion in the stator,
  a rotor mounted for rotation relative to the support, such rotor including a body on which transmission means are arranged and adapted to transmit the vibratory motion of the stator to the rotor and in order to drive such rotor in rotation, and
  elastic support means for the rotor on the stator,
characterized in that the body of the rotor is formed by a structure which is elastically deformable, at least in the direction of the stator, and which at least in part forms said support means.

But other characteristics and advantages of the invention will appear upon reading the detailed description which follows made having reference to the attached drawings which are given solely by way of example.

DESCRIPTION OF THE PREFERRED EMBODIMENTS

Figure 1:
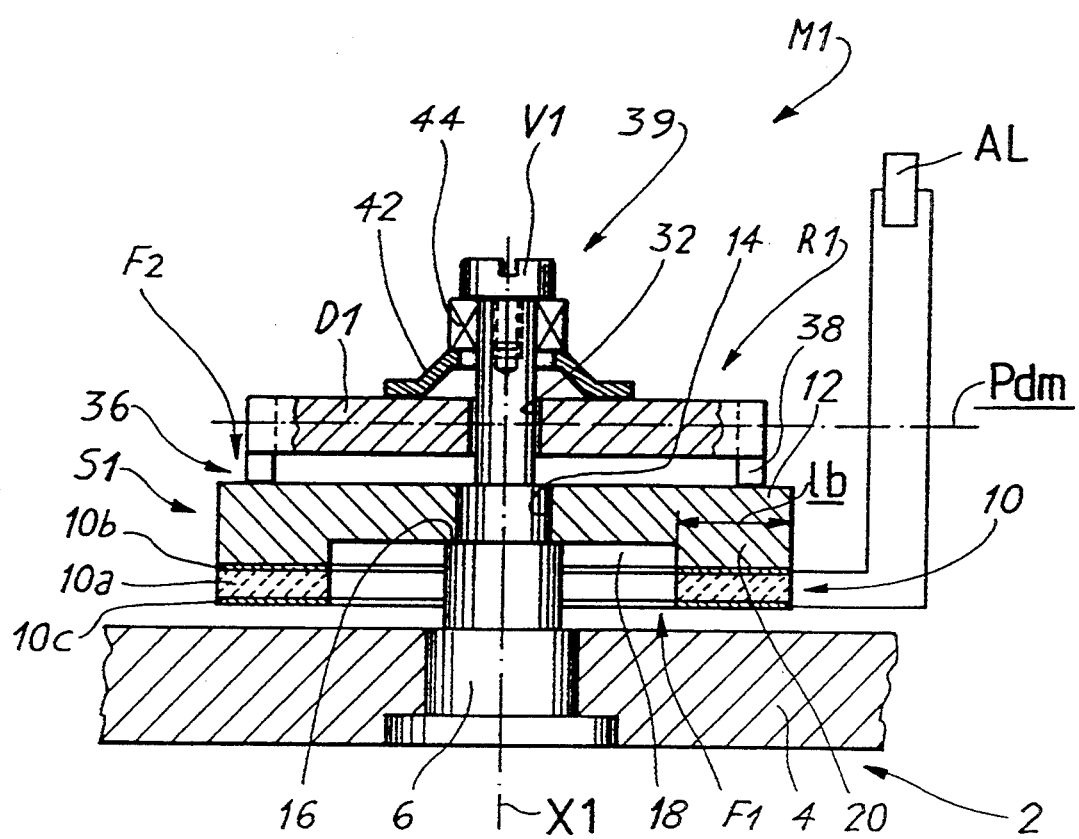
FIG. 1 is a longitudinal cross-section of a known standard piezoelectric motor.

In referring to FIG. 1, there will be described hereinafter a standard piezoelectric motor such as that described in U.S. Pat. No. 5,233,257.

Such motor, which is indicated by the general reference M1, includes a support 2 which, in this example, is constituted by a footing 4 in which is embedded, in particular by force fitting of the driving in type, a stepped spindle or stud 6 which projects therefrom.

Stud 6 materializes a geometric axis X1 forming a geometric rotation axis around which may rotate a rotor R1. The footing 4 as well as stud 6 are formed of a metallic material such as brass or an alloy of the stainless steel type.

The assembly footing 4-stud 6 thus constitutes a fixed structure forming the support for this piezo-electric motor.

Motor M1 furthermore includes a stator S1 which is fixedly mounted likewise by force fitting (driving in) or by gluing on stud 6.

On such stator are assembled piezoelectric means 10 constituted on one hand by a piezoelectric element 10a, such as a ceramic which is uniformly polarized according to its thickness and, on the other hand, by two electrodes 10b and 10c which are coupled in a standard manner to an electrical source AL, here shown in schematic fashion.

Piezoelectric means 10 thus form a transducer which, in response to electrical excitation provided by the source AL via electrodes 10b and 10c, may assume a vibratory motion. Such piezoelectric phenomena as well as the design and arrangement of such piezoelectric transducers in motors of this type are well known to persons skilled in the art and consequently will thus not be described here in a detailed fashion.

Stator S1 is constituted by a disc 12 including at its center a through orifice 14 which, in this example, is fixedly retained on stud 6. Disc 12, which forms the framework of stator S1, rests in axial support on a shoulder 16 of such stud.

As is seen in particular on FIG. 1, a face F1 of disc 12 arranged facing the footing 4 and referred to as the back face, is hollowed out in its central portion in order to leave a blind cavity or counterbore 18 opening out towards footing 4.

Such cavity 18 bounds on the back face F1 of disc 12 an annular flange 20 on which are fixedly mounted the piezoelectric means 10 which have the same annular form.

As to rotor R1, this rests in axial support on a face F2 of disc 12 opposite face 1, while it is freely engaged by a central orifice 32 on stud 6.

Rotor R1 includes a body which is formed in this embodiment by a disc D1 of small thickness formed of a material such as metal, ceramic or hard plastic. In this arrangement, disc D1 forms a rigid carrying structure capable of engaging with coupling means, not shown.

The piezoelectric motor M1 further includes motion transmission means 36 adapted to transmit to rotor R1 the vibratory motion of stator S1 and to displace rotor R1 in rotation around its axis X1 in an intermediate displacement plane Pdm normal to the rotation axis X1.

Such transmission means 36 are formed by elastically deformable elements constituted by flexion blades 38. The flexion blades 38 are, in the example of FIG. 1, embedded in disc D1 forming the carrying structure or body of rotor R1.

Continuing to refer to FIG. 1, it will be noted that rotor R1 is urged in an axial direction towards stator S1 through bearing means 39. Such means 39 which enable the axial support of rotor R1 on stator S1 are here constituted by a spring in the form of a dome 42 mounted on stud 6 and urged in an axial direction by a roller bearing 44 which itself is arranged on stud 6 and which is maintained on the latter by a headed screw V1 mounted at the free end of said stud. Such support means enable the adjustment of the bearing pressure of rotor R1 on the stator S1 by screwing or unscrewing of screw V1.

Figure 2:
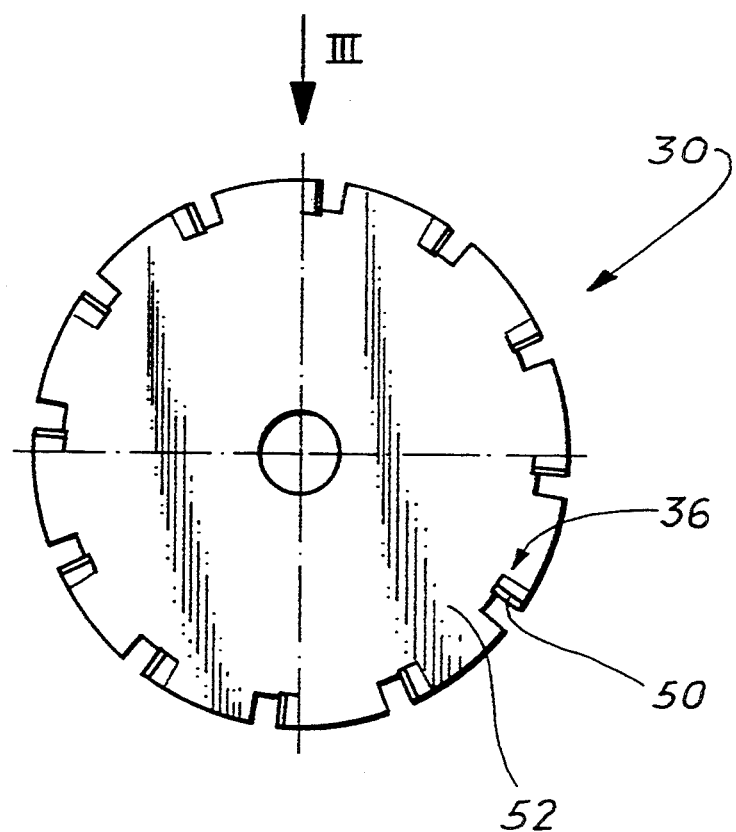
FIG. 2 is a view taken along the arrow II of FIG. 3 showing, seen from below, a special embodiment of a rotor element of the motor described in the abovementioned Swiss application.
Figure 3:
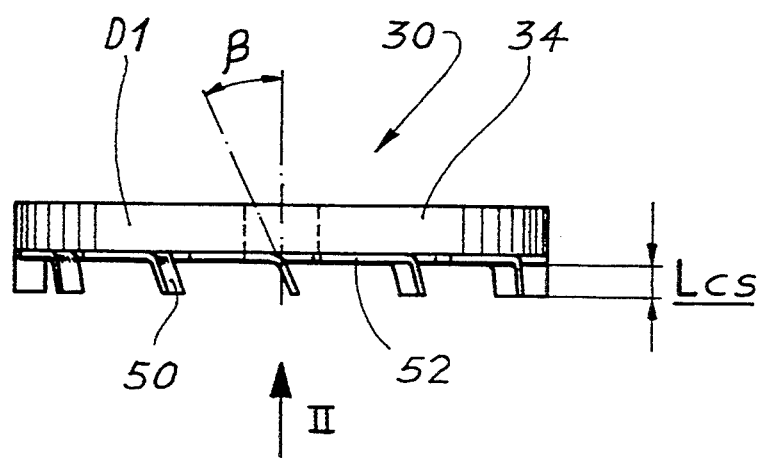
FIG. 3 is a side view taken along the arrow III of FIG. 2, but showing the element of such figure associated with a rigid disc in order to form a standard rotor intended to equip the motor of FIG. 1.

FIGS. 2 and 3 show a special embodiment of the rotor described in the abovementioned Swiss application.

In this embodiment, the elastically deformable elements 36 are constituted by bent back flexion blades 50 (of which only one is referenced) formed on a full disc 52 with which such latter are materially integral. Disc 52 is mounted under disc D1 forming the body of rotor R1 and it is rigidly fixed thereto.

In this embodiment, the flexion blades 50 are formed at the periphery of disc 52 by a cold deformation operation and in particular by swaging.

In referring henceforward to FIGS. 4 to 15, there will be described hereinafter a piezoelectric motor according to the invention. On such figures, there have been used the same references as those of the preceding figures in order to indicate elements analogous to those previously described.

Initially, there will be described a piezoelectric motor according to a first embodiment of the invention, shown on FIGS. 4 and 5 and identified thereon by the general reference M2.

Motor M2 includes a rotor R2 which is mounted to rotate around the geometric axis X1 on a stator S2 embedded in the footing 4.

Stator S2 includes a carrying structure assuring the support of rotor R2, such structure being basically constituted by an annular suspended plate P2 fixedly maintained in the footing 4. Plate P2 is formed on the one hand by an elastically deformable disc 60 under which are secured the piezoelectric means 10 and which exhibits a small uniform thickness on the order of 0.1 mm ($0.1 \cdot 10^{-3}$ meters).

The plate P2 includes on the other hand a tubular cylindrical pipe 62 projecting from disc 60 and materially integral with the latter. Pipe 62 is thus fixedly driven in by force mounting or by gluing in an orifice not referenced of footing 4.

Pipe 62 includes a central through orifice 64 into which is driven in a smooth cylindrical headed stud V2 which assures axial maintenance and centering in rotation of rotor R2 around axis X1 thanks to two coaxial journals (not referenced) formed on the latter.

To this end, rotor R2 includes a stepped tubular hub 66 of rigid structure mounted to rotate around axis X1 on stud V2.

Hub 66 includes mechanical driving means formed, for example, by external teeth 67 arranged on the periphery of the latter. The teeth 67 are intended to be brought into mesh with a mechanism to be driven, not shown.

Hub 66 includes furthermore, under teeth 67 (in assuming the motor M2 in its position shown on FIG. 4) a shouldered journal 68 on which the body of rotor R2 is fixedly engaged.

In an advantageous manner, the body of rotor R2 is, according to the invention, basically constituted by a perforated flexible disc D2.

Figure 5:
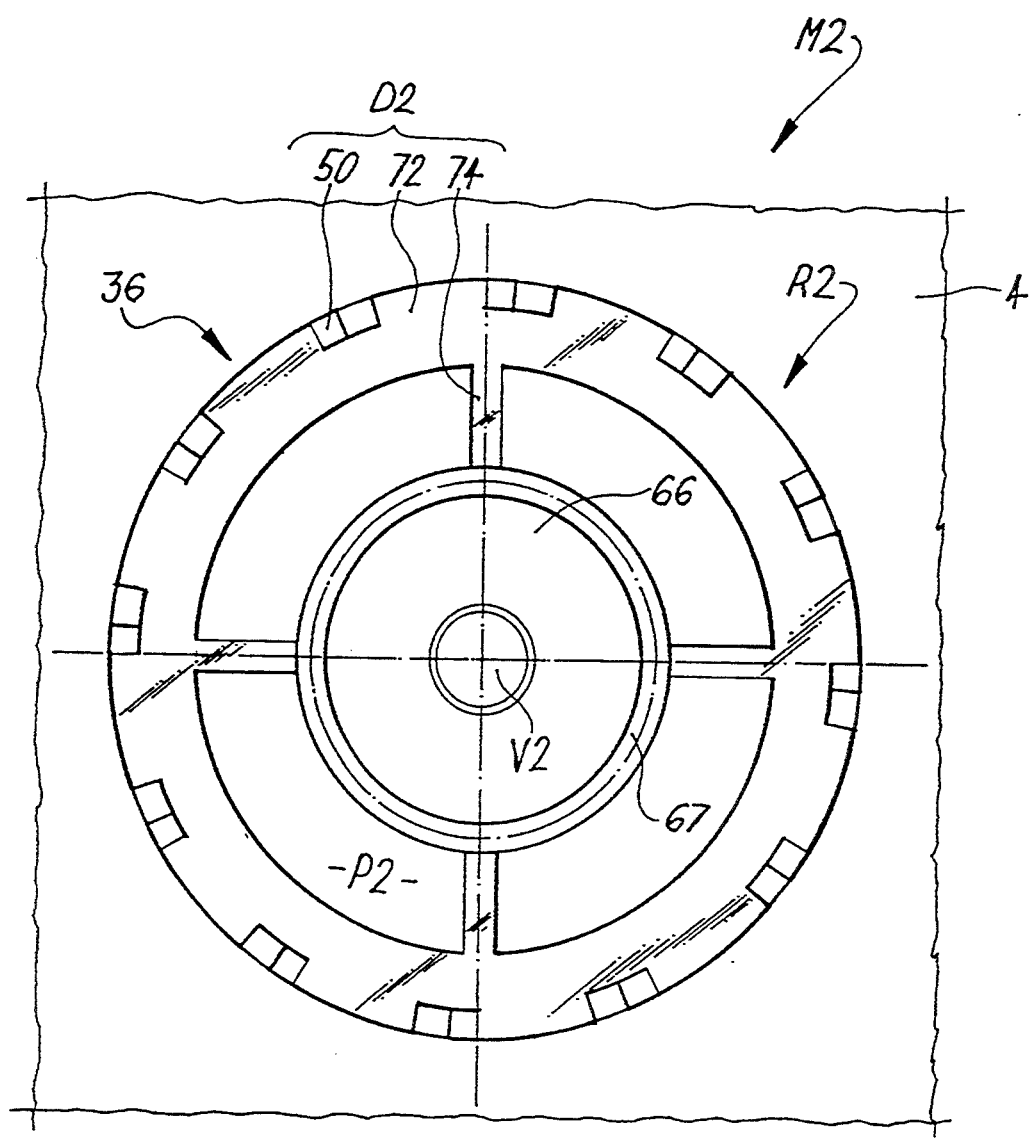
FIG. 5 is a view from above of the motor of FIG. 4.
Figure 6:
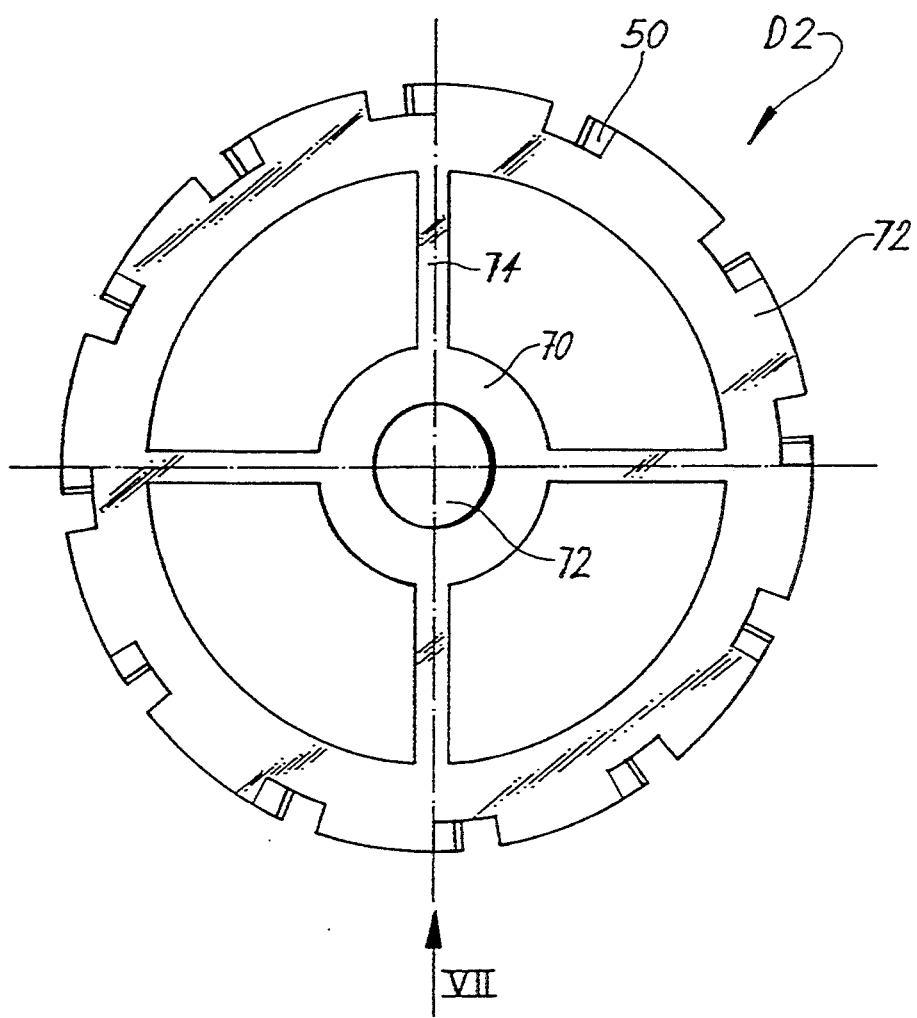
FIG. 6 is a view taken along arrow VI of FIGS. 4 and 7 showing solely the body and the transmission blades of the rotor equipping the motor according to the invention.
Figure 7:
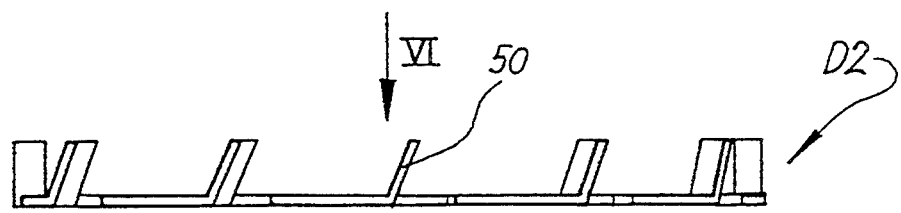
FIG. 7 is a view taken along arrow VII of FIG. 6 and showing from the side and in a rest position the assembly body-blades of FIG. 6.

As is seen more specifically on FIGS. 5 and 6, disc D2 includes an annular central portion 70 (FIG. 6) which includes a central opening 72 and which is bound by such opening to the hub 66 in being fixedly engaged on the shouldered supporting surface 68.

Disc D2 furthermore includes a peripheral ring 72 on which are formed flexion blades 50.

Additionally, disc D2 includes flexion arms 74, for example here four in number, a single one being referenced, which connect elastically the central portion 70 and the peripheral ring 72. The transmission means 36, which are formed by flexion blades 50, extend from the peripheral ring 72 towards stator S2, the flexion arms 74, central portion 70 as well as ring 72 being materially integral and forming a monolithic rotor piece. It will be specified that the peripheral ring 72, flexion arms 74 and the central portion 70 exhibit the same thickness and are, in the rest state (FIGS. 7 and 9) arranged in a common plane (not referenced).

It is thus understood that the body of rotor R2 is formed by a structure which is elastically deformable, at least in the direction of stator S2, and which forms at least partially the elastic bearing means of rotor R2 on stator S2, such means being referenced 79. Such means are also partially formed by hub 66 which urges disc D2 axially towards the stator in an axisymmetric manner (relative to axis X1) in being maintained by the head, not referenced, of the embedded stud V2.

It is understood that in other words, the body of rotor R2 is basically formed by the elastically deformable disc D2 which forms in integrated fashion said transmission means 36 and said elastic bearing means 79.

Figure 4:
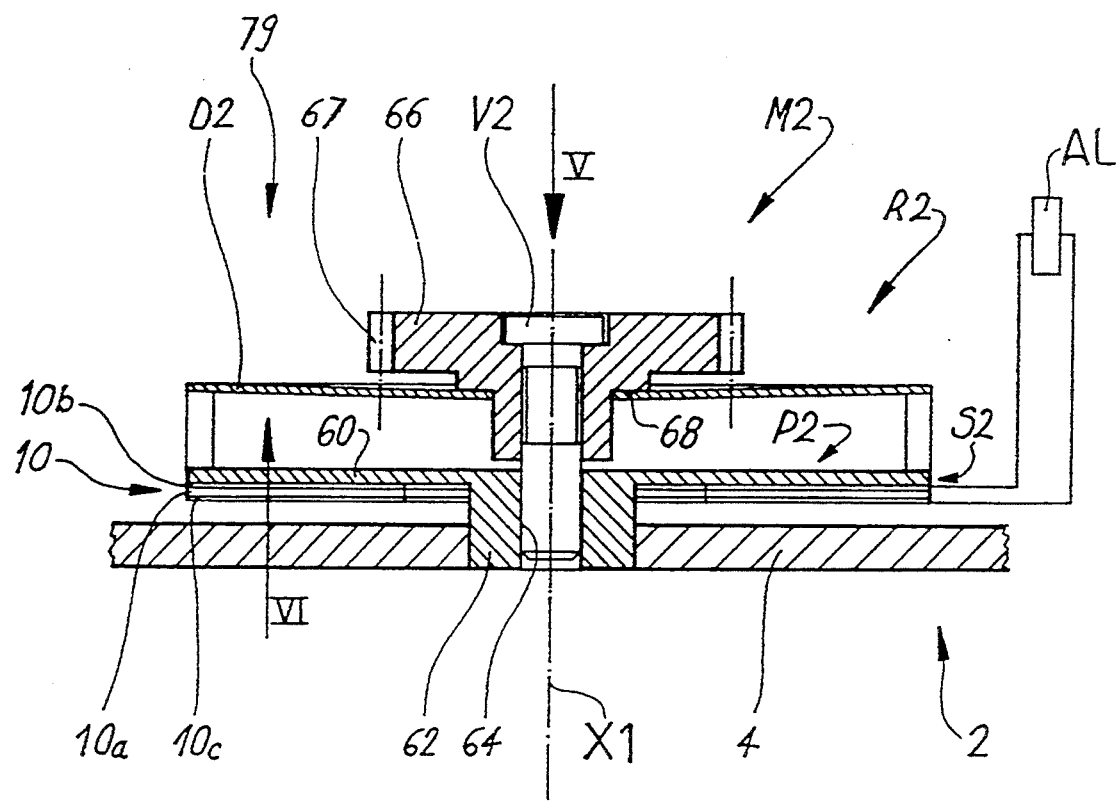
FIG. 4 is a longitudinal cross-section showing a motor according to a first embodiment of this invention.

As is seen on FIG. 4, in the assembled state and ready to function, hub 66 under the action of stud V2 permanently deforms the body of rotor R2 which is prestressed and which assumes the form of a basin.

Furthermore, it will be specified that electrodes 10b and 10c of the piezoelectric means 10 both exhibit in frontal projection a filled-in whole structure, i.e. not cut out and not structured by polarized segments as is the case in standard structures.

Here it will be specified that disc D2 forming the stator S2 is preferably formed of metallic material such as brass, a stainless steel alloy or aluminium, possibly coated with a thin layer of hard material, in particular chromium or titanium nitride. Electrodes 10b and 10c are preferably formed of nickel or silver.

Figure 9:
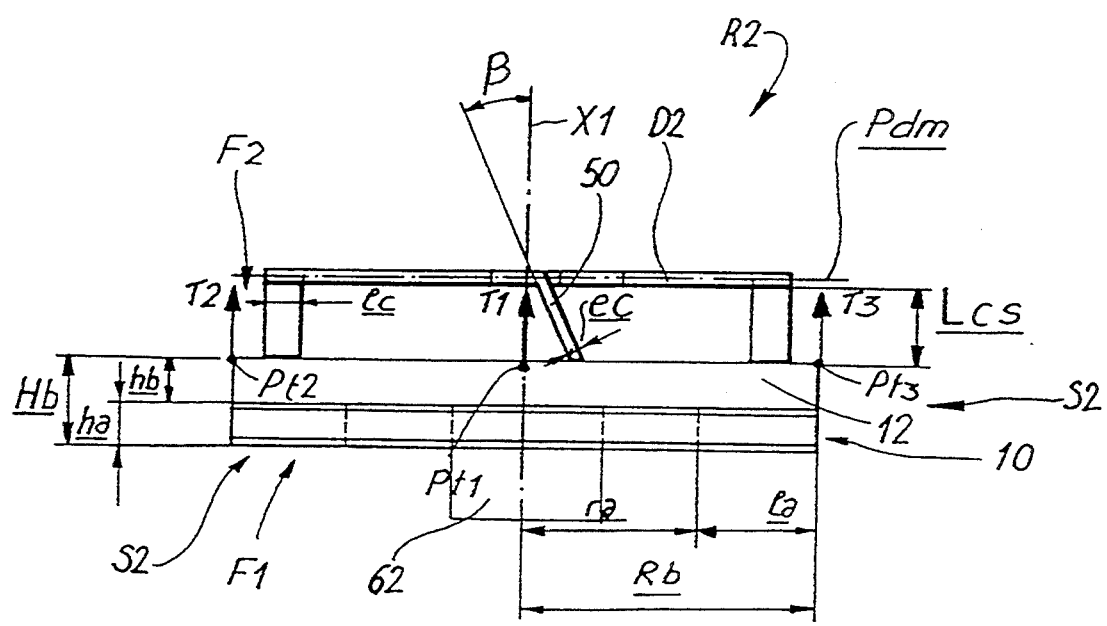
FIG. 9 is a side view solely of the rotor and stator of FIG. 4, but shown to a different scale for better understanding of the drawings.

Referring henceforward to FIG. 9, there will be given some more specific indications concerning the structure of rotor R2 and stator S2.

Flexion blades 50 thus project from rotor R2 and in particular from the disc D2 in the direction of the front face of stator S2 according to an inclination angle $\beta$ having as origin a line parallel to the rotation axis X1. Preferably, angle $\beta$ is comprised between 10° and 30°.

Furthermore, each flexion blade 50 which has a planar form of the parallelepipedon type projects from rotor R2 over a free length Lcs preferably chosen from the values situated between 0.1 and 0.5 mm (0.1 and $0.5 \cdot 10^{-3}$ meters). Preferably each blade 50 exhibits a thickness ec having a value between 0.025 and 0.1 mm (0.025 and $0.1 \cdot 10^{-3}$ meters) and a width Lc having a value located between 0.1 and 0.3 mm (0.1 and $0.3 \cdot 10^{-3}$ meters). It is thus noted that the flexion blades 50, which are interposed between rotor R2 and stator S2, end up and rest directly on the planar front face F2 of stator S2, the front face F2 being smooth and free from all projecting or protruding elements.

Flexion blades 50 are formed of a material such as an alloy of the beryllium-copper type or of the stainless steel type.

Figure 10:
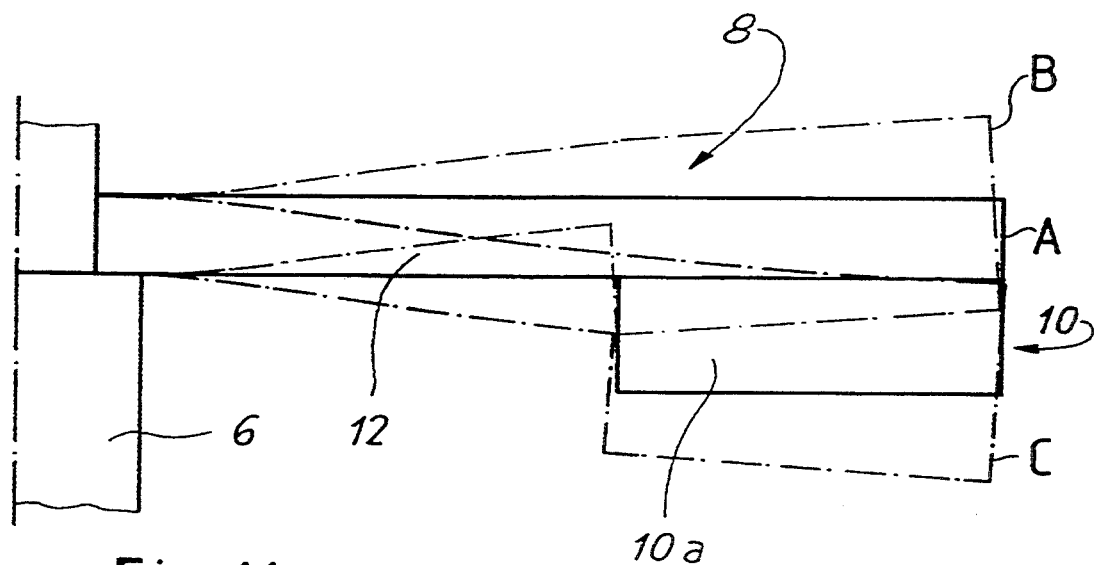
FIG. 10 is a half-view in cross-section of the stator of FIGS. 4 and 8, shown in full lines in its rest position and in broken mixed dashes in its two extreme positions of deformation when such stator is excited into vibration according to a first variant of the vibratory motion according to the invention.
Figure 11:
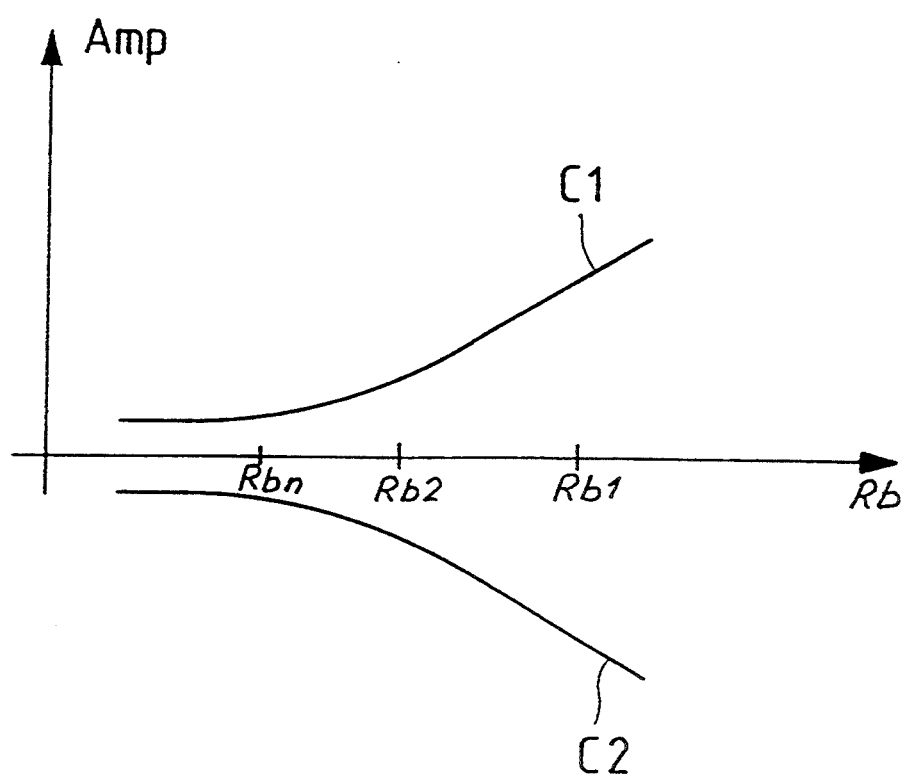
FIGS. 11 and 12 are diagrams showing the curves of amplitude variation of the deformation of the stator according to the invention as a function respectively of the radius on the stator and from an angular position on the latter.
Figure 12:
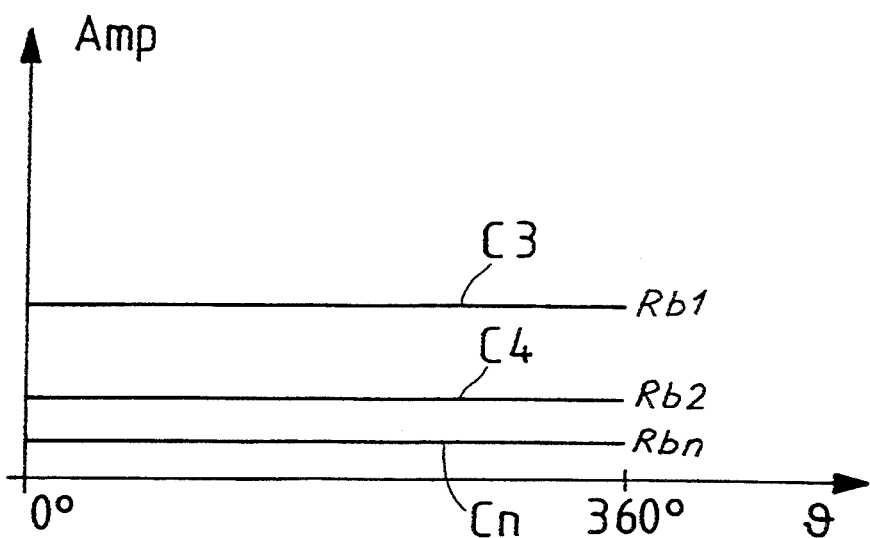

Referring henceforward to FIGS. 10 to 12, there will be described hereinafter a first variant of the vibratory motion of the stator according to the invention, given by way of example.

As the half view in cross-section of stator 2 shown on FIG. 10 clearly shows, stator S2 exhibits a flexion deformation on either side of its rest position designated by reference A. Such deformation is shown in a highly exaggerated manner by the high and low end positions B and C and in reality it does not exceed a beating amplitude greater than 5 $\mu$m ($5 \cdot 10^{-6}$ meters), at the periphery of the stator (peak). Such deformation gives stator S2 a basin form. Such basin deformation is due to the flexion stresses generated in stator S2 thanks to the piezoelectric means 10. Such flexion stresses are due to the heterogeneous bimorph structure formed by the rigid assembly of the piezoelectric means 10 on stator S2.

Here it will be specified that in order to obtain the sought-after deformation of stator S2, there is employed a special ceramic adapted so as to be deformed radially when a specific electrical excitation is applied thereto via the electrodes. More specifically, there has been chosen a ceramic exhibiting a high piezoelectric constant $d_{31}$, such constant representing the deformation obtained relative to the applied field.

Such vibratory motion is of the axisymmetric type and provides the stator with a deformation of the same type. This is corroborated by the curves C1 and C2 of FIG. 11 where it is noted that the amplitude variation Amp of stator S2 as a function of its radius Rb is of the same sign, that is to say, increasing from the center towards the periphery of stator S2.

It is noted that curves C1 and C2 show no point of inflexion nor any passage through a null amplitude value. Such vibratory mode thus will cause no nodal circle to appear on stator S2. Such characteristic is confirmed by curves C3 to Cn which exhibit all the amplitude values different from zero. Such curves C3 to Cn show the amplitude variations of the stator as a function of the angular position thereon, such variations being measured for a positive amplitude variation corresponding to curve C1 of FIG. 11. Additionally, it is observed that such curves are straight lines and altogether parallel among themselves, which demonstrates that such vibratory mode does not induce any nodal diameter. One thus has a vibration according to the international standard $B_{nm}$ (n being the number of nodal circles and m the number of the nodal diameter) of the type $B_{00}$.

It will also be specified that such vibratory motion and such axisymmetric deformation are centered on the rotation axis X1. There has thus been provided a planar stepped motor, that is to say, having a stator and a rotor of basically planar and superposed form, which motor, thanks to the axisymmetric motion centered on the rotation axis and oriented therealong, is of the type having basically axial vibratory motion with reference to axis X1.

Thanks to these vibration modes and axisymmetric deformation of very small amplitude, each point, for example Pt1 to Pt3 (FIG. 9) of stator S2 effects, at least in projection on axis X1, an essentially linear displacement along a direction parallel to the rotation axis X1 of the same amplitude for each circle inscribed on the rotor at the level of a given radius (for example Rb1 to Rbn) and in phase.

At every point of the stator and in particular in the contact region between the stator and the rotor, the axisymmetric vibration mode of the piezoelectric motor according to the invention provides velocity components T (three only, T1 to T3 being shown on FIG. 9) basically normal to the displacement plane Pdm of rotor R2. Stator S2 thus exhibits no significant velocity component in the displacement plane pdm in view of the extremely low vibration amplitudes. It thus exhibits no acceleration of the radial, centrifugal or centripetal type which could be significant. It is also remarkable to note that such stator does not exhibit any tangential acceleration which acceleration to the contrary is found in stators of standard piezoelectric motors having an advancing or standing wave vibratory mode.

Figure 13:
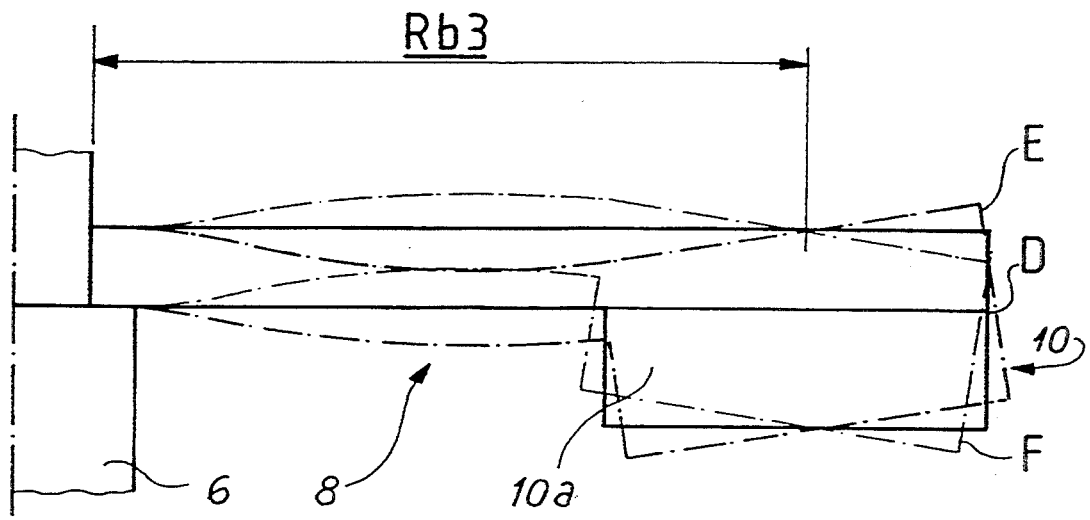
FIG. 13 is a half-view in cross-section similar to FIG. 10, but showing a second variant of the vibratory motion according to the invention.
Figure 14:
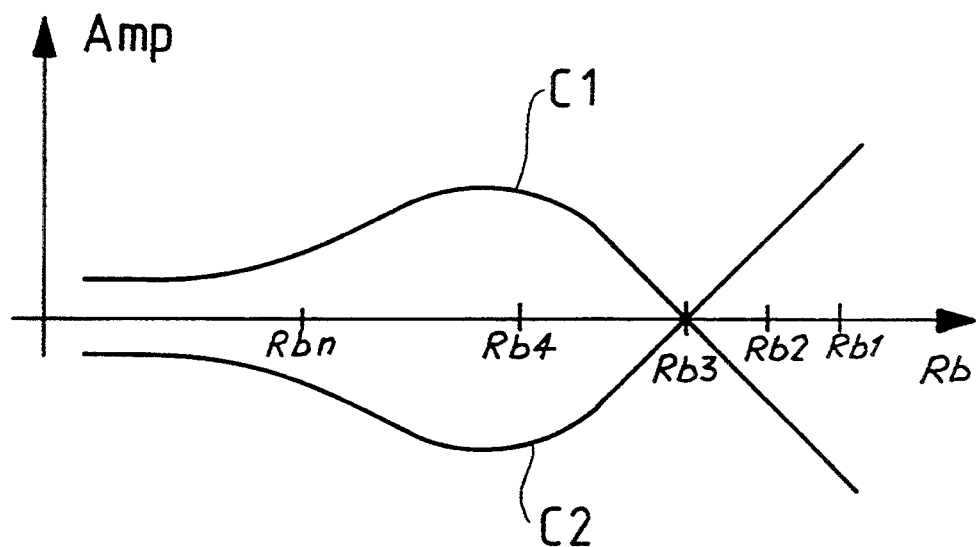
FIGS. 14 and 15 are respectively views similar to those of FIGS. 11 and 12, but showing curves of variation of amplitude of the stator when it is set into vibration according to the variant of the vibratory mode of FIG. 13.
Figure 15:
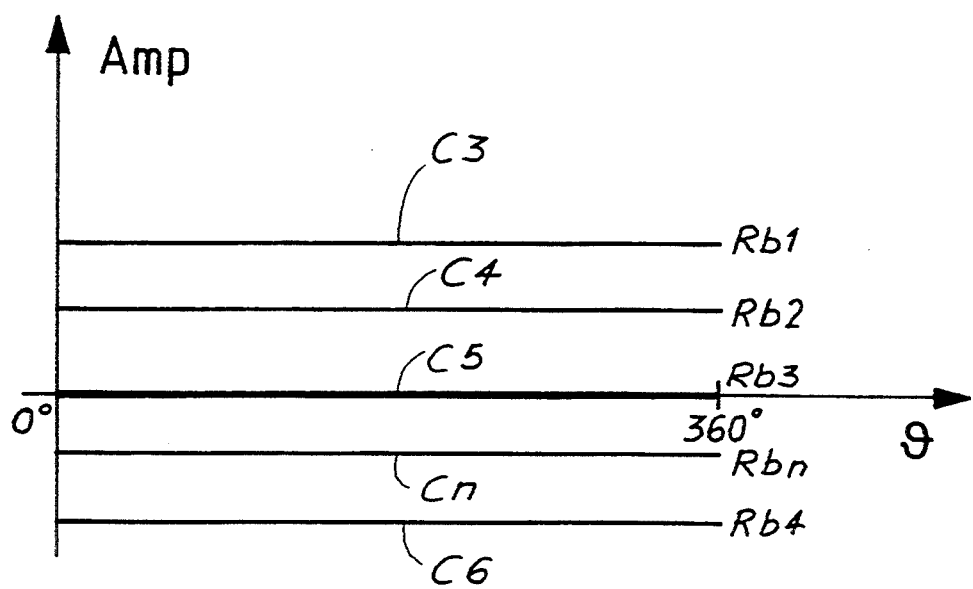

FIG. 13 shows the deformation of stator S2 when it is subjected to a second variant of the axisymmetric vibratory motion according to the invention, reference D showing the rest position while references E and F show the behaviour of the stator in its deformation end positions when it is excited. Such motion this time exhibits a nodal circle designated in particular at radius Rb3 (FIGS. 14 and 15). It is noted effectively that curves C1 and C2 of FIG. 14 pass through an amplitude of null value marking a vibratory node in the stator. Curves C3 to Cn of FIG. 15 show the axisymmetric character of the vibratory mode and of the deformation of stator S2 in showing that for a given radius Rbx of the stator every circle inscribed on the latter exhibits over 360° a constant amplitude (peak value), curves C3 to Cn of FIG. 15 being straight lines parallel to one another. Such curves C3 to Cn represent the amplitude variations of the stator as a function of angular positions thereon, such variations being measured for an amplitude variation corresponding to curve C2 of FIG. 14. Such vibratory mode does not induce any nodal diameter on stator S2. Such vibratory mode is thus of the type $B_{10}$.

To obtain such axisymmetric vibratory modes of the type $B_{00}$ and $B_{10}$, after having dimensioned the stator and the piezoelectric means by way of example in the manner according to FIG. 9, there has been generated by means of the electrical source AL, an alternating current of frequency F, the dimensions and frequencies for such modes having the following values:

|  | Mode $B_{00}$ | Mode $B_{10}$ |
|---|---|---|
|  | in mm ($10^{-3}$ m) | in mm ($10^{-3}$ m) |
| Hb | 0.2 | 0.2 |
| hb | 0.1 | 0.1 |
| Rb | 2.5 | 2.5 |
| ra | 1 | 1 |
| ha | 0.1 | 0.1 |
| la | 1.5 | 1.5 |
|  | in KHz ($10^3$ hertz) | in KHz ($10^3$ hertz) |
| F | 14 | 94 | where Hb is the overall height of the stator (disc 60 plus piezoelectric means 10), $h_b$ the height of disc 60, that is to say, the height Of the stator without the piezoelectric means 10, Rb the maximum radius of the stator (taken at the periphery of disc 60), ra the minor radius of the ring forming the piezoelectric means 10, ha the overall height of such piezoelectric means 10 (the thickness of the electrodes here being negligible), la the width of the piezoelectric means 10 and F the vibration frequency of stator S2. Disc 60 is in this case constituted by a stainless steel alloy while the piezoelectric element 10a is constituted by a piezoelectric ceramic of the type PZT (lead titanate doped with zirconium). Being given that two variants of the axisymmetric vibratory mode have been described here ($B_{00}$ and $B_{10}$), it will be understood that the vibratory mode of the motor according to the invention may be generalized to a notation of the type $B_{xo}$ where x can vary from 0 to a number n.

In operation, the piezoelectric means 10 are excited by the electrical source AL, which causes them to vibrate. The radial component of the vibration of the piezoelectric means generates a flexure vibration of disc 60 by the heterogeneous bimorph principle known to persons skilled in the art.

The electrical source AL furnishes an alternating signal of frequency F corresponding to the resonance frequency of the desired mode $B_{x0}$.

Stator S2 in its entirety is thus excited in resonance in the mode $B_{x0}$ corresponding to an axisymmetric vibratory motion such as has been described hereinbefore.

The deformation in flexure of the stator and thus the essentially linear displacement of each elementary point on the stator (in particular in projection on the rotation axis X1) due to the peak obtained is transformed into a concomitant displacement in rotation of rotor R2 in the displacement plane Pdm, and this thanks to the elastically deformable elements 36 formed by the flexion blades 50. Such elements 36, in being urged, bend and induce velocity components tangential to the periphery of the rotor into rotor R2 and parallel to the displacement plane Pdm of the rotor R2 and located therein.

The elastically deformable elements 36 formed by the flexion blades 50 thus form motion transformation means capable of transmitting and at the same time transforming the basically axial linear (or normal) motion of the stator into a perpendicular rotary motion of the rotor.

In referring henceforward to FIG. 8 wherein the same references have been utilized as those of the preceding figures in order to identify elements analogous to those previously described, there will be hereinafter described a second embodiment of the motor according to the invention indicated by the general reference M3.

Motor M3 includes a stator S3 which is provided with the piezoelectric element 10 and the annular disc 60 described hereinbefore. On such stator S3 is assembled a rotor R3 the body of which is identical to rotor R2 and which includes a flexible perforated disc D3 of the same structure as disc D2.

Rotor R3 is distinguished in that it includes a stepped hub 80 driven onto a driving spindle 82 traversing stator S3, through a pipe 84 materially integral with disc 60 of the suspended plate P3.

Figure 8:
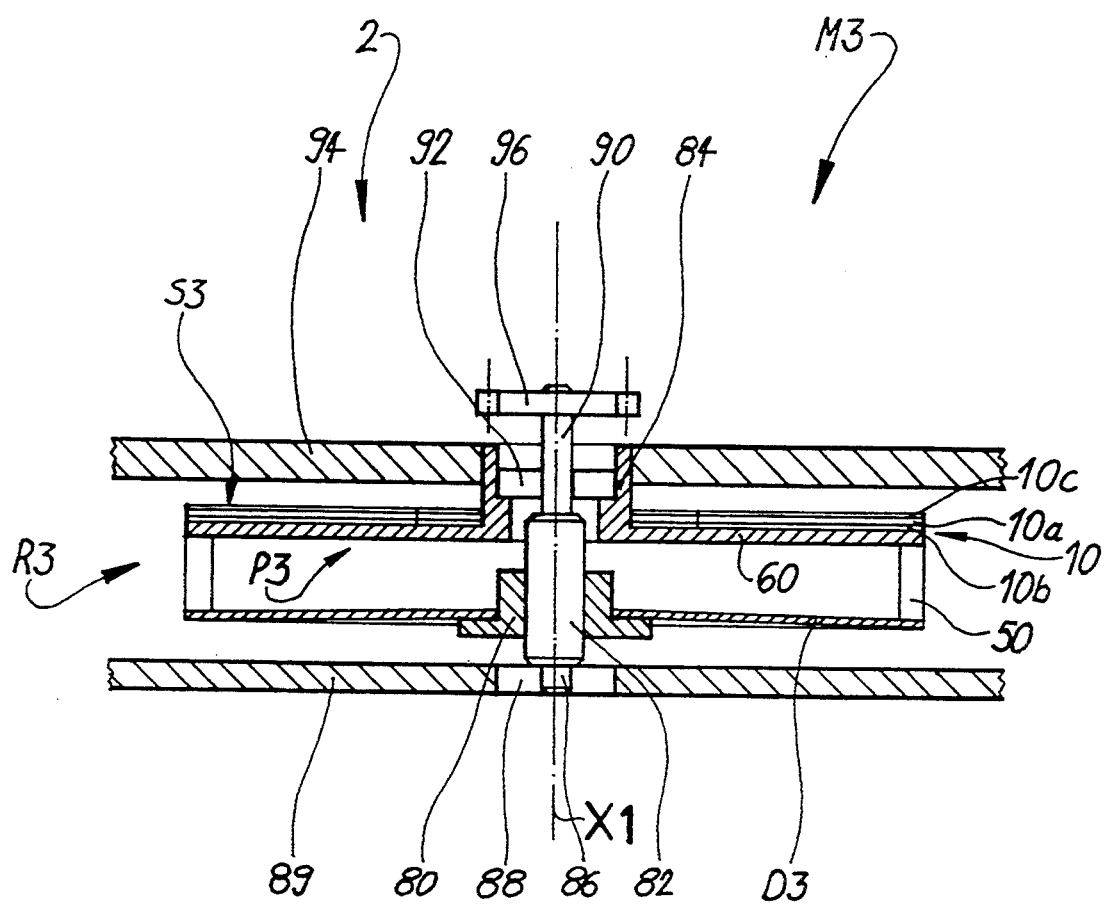
FIG. 8 is a view in longitudinal cross-section showing a motor according to a second embodiment of the invention.

Hub 80 serves only to support the flexible perforated disc D3 in order to keep it urged under elastic stress towards plate P3 of rotor R3 as shown on FIG. 8.

The driving spindle 82 is assembled by a first guide means 86 formed by a pivot (same reference) mounted for rotation in a bearing 88 formed, in this example, by a stone driven into a second support 89 formed by a base plate or by a bridge of a timepiece movement, here partially shown.

Such spindle 82 is supported for rotation by a second guide means 90 constituted by a cylindrical bearing surface (same reference) formed on spindle 82 and mounted to rotate in a bearing 92 likewise formed by a stone which is driven into a counterbore, not referenced, formed in pipe 84. It will be observed that pipe 84 itself is driven into a base plate or a bridge 94 which forms the support 2 of stator S3.

It will be furthermore specified that the driving spindle 82 which is fixed for rotation with rotor R3 via hub 80, in order to assure its guidance around axis X1 is mounted at least for rotation on the interior of support 2 which it traverses in order to project to the exterior thereof and to cooperate with a mechanical engagement means 96.

Such mechanical engagement means 96 is constituted by way of example by an exteriorly toothed pinion adapted to be brought into mesh with a mechanism to be driven, not shown.

Stator S3 exhibits, by way of example, the same vibration modes as those previously described, motors M3 and M2 exhibiting by way of example the same dimensions.

What is claimed is:

1. A piezoelectric motor of the type comprising:
support, a stator fixed to the support, piezoelectric means adapted to be electrically excited so as to induce a vibratory motion in the stator, a rotor having a hub mounted for rotation relative to the support, said rotor including a body solid with said hub and on which flexion blades are arranged to form transmission means for transmitting the vibratory motion of the stator to said rotor and in order to drive said rotor in rotation, and elastic support means for pushing said flexion blades on the stator, the body of the rotor being formed by a flexible structure which extends radially from said hub to said flexion blades and which is elastically deformable, at least in the direction of the stator, said flexible structure forming said elastic support means, said flexion blades being formed directly in the elastic body of the rotor and being materially integral therewith.

2. A piezoelectric motor as set forth in claim 1, wherein the body of the rotor is basically constituted by a pliable disc.

3. A piezoelectric motor as set forth in claim 1, wherein the body of the rotor is basically constituted by a perforated disc.

4. A piezoelectric motor as set forth in claim 2, wherein the disc forming the body of the rotor includes flexion arms which elastically couple a central portion of the rotor and a peripheral ring formed on the latter to which said flexion blades are conformed.

5. A piezoelectric motor as claimed in claim 2 wherein the body of the rotor is basically constituted by a perforated disc.

6. A piezoelectric motor as claimed in claim 5 wherein the disc forming the body of the rotor includes flexion arms which elastically couple a central portion of the rotor and a peripheral ring formed on the latter to which said flexion blades are conformed.

7. A piezoelectric motor as set forth in claim 1, wherein said hub has a shouldered journal on which the body of the rotor is fixedly engaged.

8. A piezoelectric motor as set forth in claim 7, wherein said body of the rotor is constituted by a flexible disc having an annular central portion including a central opening engaged on said shouldered journal.

9. A piezoelectric motor as set froth in claim 1, wherein said hub is axially maintained and guided in rotation through a headed stud engaged in the stator, said hub permanently deforming said body of the rotor which is prestressed thereby and which assumes the form of a basin.

* * * * *